United States Patent [19]

Suzuki et al.

[11] 4,062,059
[45] Dec. 6, 1977

[54] INFORMATION PROCESSING SYSTEM

[75] Inventors: Seigo Suzuki, Yokohama; Yoshiaki Moriya, Inagi, both of Japan

[73] Assignee: Tokyo Shibaura Electric Co., Ltd., Tokyo, Japan

[21] Appl. No.: 732,872

[22] Filed: Oct. 15, 1976

[30] Foreign Application Priority Data

Oct. 15, 1975   Japan .............................. 50-123238

[51] Int. Cl.² ............................................. G06F 13/00
[52] U.S. Cl. .................................... 364/200; 364/900
[58] Field of Search ........................................ 364/900

[56] References Cited

U.S. PATENT DOCUMENTS 3,328,772   6/1967   Oeters ............................ 340/172.5

OTHER PUBLICATIONS

IBM Tech Disclosure Bulletin, vol. 15, No. 12, May 1973, by N. T. Christensen et al.

Primary Examiner—Gareth D. Shaw
Assistant Examiner—C. T. Bartz

Attorney, Agent, or Firm—Finnegan, Henderson, Farabow & Garrett

[57] ABSTRACT

In an information processing system comprising a central processing unit, an input/output unit and a first-in first-out stack connected between these units there are provided a buffer control circuit for detecting the full and empty states of the first-in first-out stack, an input/output control circuit connected between the first-in first-out stack and the input/output unit for detecting a predetermined state of the input/output unit, a status register for storing specific states of the first-in first-out stack and the input/output unit, a command register controlled by programmed information from the central processing unit for establishing a specific interruption condition corresponding to the specific states of the first-in first-out stack and the input/output unit, and an interruption control circuit coupled to the status register and the command register for applying an interruption signal to the central processing unit when the state signal from the status register and the interruption condition signal from the command register coincide with each other.

2 Claims, 2 Drawing Figures

INFORMATION PROCESSING SYSTEM

BACKGROUND OF THE INVENTION

This invention relates to an information processing system having an improved interface unit connected between an information processing unit and an input-/output unit.

It has been the practice to install a first-in first-out stack (FIFO) acting as a data buffer between an information processing unit such as a microcomputer and an input/output unit. Such FIFO stack is constructed to generate a "FULL" signal representing that the memory unit of the stack is full of information and an "EMPTY" signal representing that there is no information stored in the stack. Usually the FIFO stack comprises a plurality of cascade connected memory elements and is constructed such that an information initially stored in a memory element of the first stage is firstly derived out from the memory element of the last stage.

In the prior art information processing system it has been necessary to arrange a circuit including a register between a FIFO stack and an information processing unit for the purpose of detecting the state of the FIFO stack by the information processing unit. There has also been proposed a method wherein the state of the FIFO stack is indirectly detected by detecting the state of the terminal unit by the information processing unit. In this case, it is not necessary to use a circuit including a register as above described but it is necessary to constantly watch the state of the terminal unit. Accordingly, the circuit utilized to this end is complicated.

SUMMARY OF THE INVENTION

It is an object of this invention to provide an improved information processing system capable of efficiently processing information.

According to this invention there is provided an information processing system comprising first and second informaton processing units, a first-in first-out stack acting as a buffer and connected between the first and second information processing units, a first register connected to be set to a predetermined bit position in accordance with a programmed information from the first information processing unit for producing an interruption condition signal corresponding to the bit position, a first control circuit connected to detect the state of the first-in first-out stack for producing a state signal corresponding to the state, a second register connected to be set to a predetermined bit position corresponding to the state signal from the first control circuit for generating a state indicating signal, and an interruption control circuit coupled to the first and second registers for generating an interruption control signal when the state indicating signal from the second register satisfies an interruption condition established by the bit position of the first register.

DESCRIPTION OF THE PREFERRED EMBODIMENT

Figure 1:
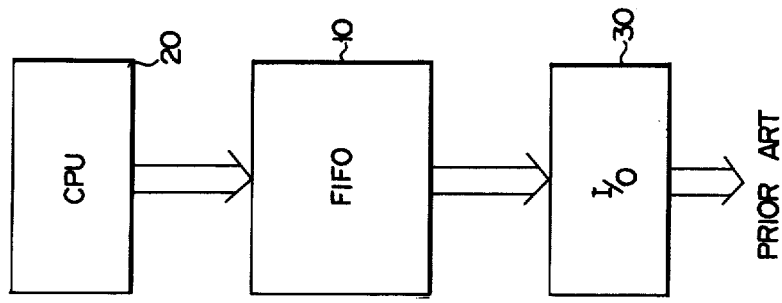
FIG. 1 is a diagrammatic representation showing the flow of information of a prior art information processing system.

A prior art information processing system shown in FIG. 1 comprises a central processing unit (CPU) 20, an input/output unit (I/O) 30 and a buffer FIFO stack 10. When information is transferred to the FIFO stack from the central processing unit 20 and when the memory capacity of the FIFO stack is filled by the transferred information, the FIFO stack produces a "FULL" signal to the central processing unit to terminate the operation thereof. If, at this time, the input/output unit 30 is operating for some other task, the FIFO stack 10 would not transfer any information to the input/output unit 30 but continue to generate a "FULL" signal. On the other hand, if the input/output unit 30 were in the operable state, the FIFO stack 10 wll transfer information to the input/output unit 30 during which the FIFO stack 10 will not produce any "FULL" signal. Accordingly, it is possible to determine whether or not the information transfer from the FIFO stack 10 to the input/output unit 30 has been commenced by detecting the "FULL" signal from the FIFO stack by the control processing unit 20.

When the FIFO stack 10 becomes empty as a result of such information transfer, the central processing unit 20 commences to transfer information to the FIFO stack 10.

While in the foregoing description information is transferred from the central processing unit, in the case of transferring information from the input/output unit to the central processing unit, when the FIFO stack 10 is empty it is in a state of accomodating the information from the input/output unit 30. On the other hand, when the FIFO stack is in a full state it is ready to transfer information to the central processing unit.

Figure 2:
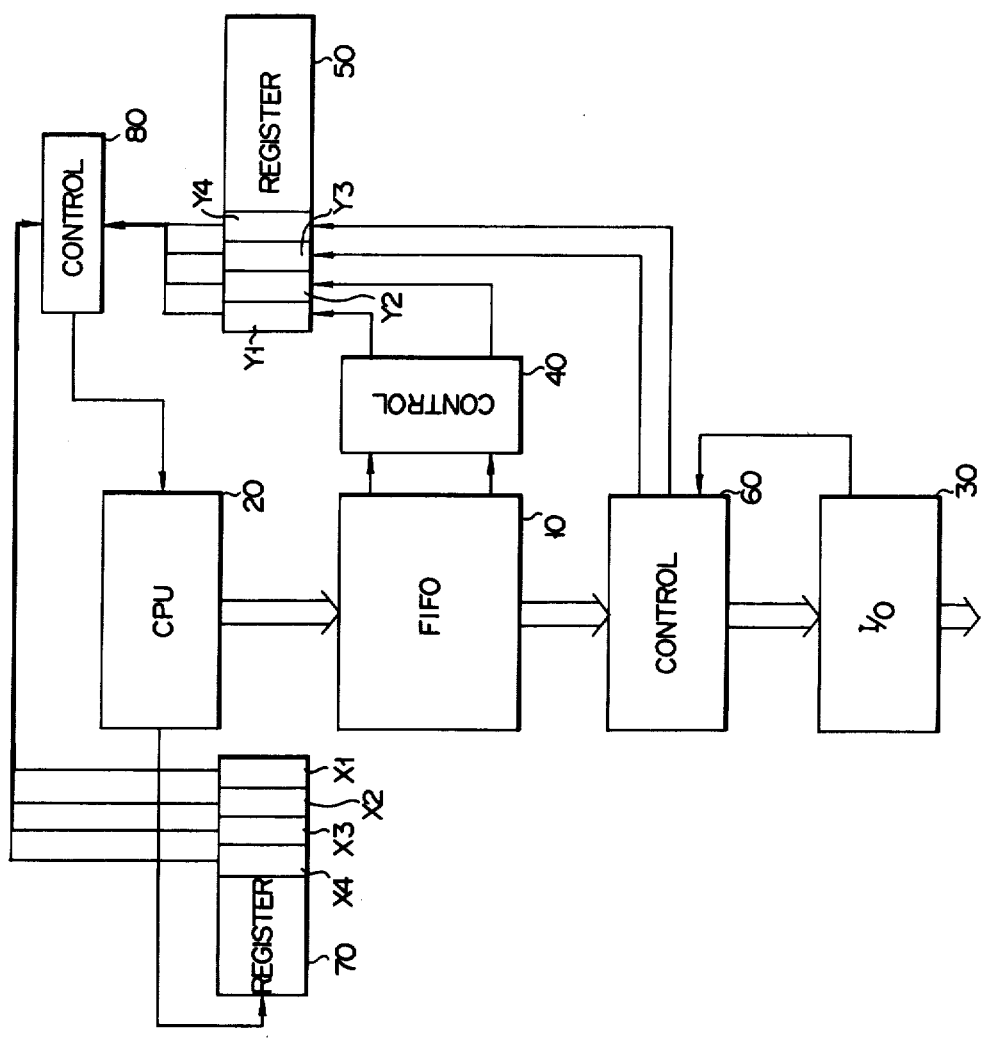
FIG. 2 is a block diagram showing one embodiment of the information processing system of this invention.

One embodiment of this invention will now be described with reference to FIG. 2, in which the component elements corresponding to those shown in FIG. 1 are designated by the same reference numerals. In FIG. 2, a buffer control circuit 40 is provided to detect the state of the FIFO stack 10 and to supply an "EMPTY" signal to a bit position Y1 of a status register 50 when there is no information received from the central processing unit 20 stored in the FIFO stack 10. But when the FIFO stack 10 is filled with the information from the central processing unit, the buffer control circuit 40 provides a "FULL" signal to a bit position Y2 of the status register 50.

An input/output control circuit 60 is connected between the FIFO stack 10 and the input/output unit 30. The input/output control circuit 60 is equipped with an interface circuit and a parity check circuit for detecting an asynchronous condition in information transfer, and when a parity error occurs at the time of transferring information from the FIFO stack to the input/output unit, the parity check circuit produces a parity error signal to a bit position Y3 of the status register 50. Whereas when an overrun occurs it supplies an overrun error signal to a bit position Y4 of the status register 50.

There is also provided a command register 70 which is connected to be controlled by a programmed control information from the central processing unit 20 to be set at either one of bit positions X1, X2, X3 and X4 and supplies a signal corresponding to the set bit position to an interruption control circuit 80. More particularly, when the command register 70 is set to bit position X1 it supplies a command signal to the interruption control circuit 80 for generating an interruption signal when the FIFO stack is empty. On the other hand, when the command register 70 is set to bit position X2, it produces a command signal for generating an interruption signal when the FIFO stack 10 is in a full state whereas at the bit position X3, the command register produces a command signal for generating an interruption signal when a parity error is detected. Further, when the command register 70 is set at the bit position X4 it produces a command signal for producing an interruption signal when an overrun of the timing occurs at the time of transferring information between the FIFO stack 10 and the input/output unit 30. Consequently, the interruption control circuit 80 applies an interruption signal to the central processing unit when it receives a signal from bit position Y1, Y2, Y3 or Y4 of the status register 50 while the command register 70 is set at a corresponding bit position X1, X2, X3 or X4 thereby changing the operation of the central processing unit 20 to an interruption processing mode.

Assume now that the command register 70 is set to bit position X3 by a programmed information from the central processing unit 20 and that information is being transferred from the FIFO stack 10 to the input/output unit 30, and where a parity error is detected during the information transfer, the status register 50 is set to bit position Y3 whereby the interruption control circuit 80 produces an interruption signal to the central processing unit 20. In this manner, the operation of the central processing unit 20 is controlled very smoothly and efficiently by the command register 70 which establishes an interruption condition in accordance with the programmed information from the central processing unit 20 and the status register 50 which stores the state information corresponding to the interruption condition. When the state of the status register 50 set to one of the bit positions Y1 through Y4 are detected by the interruption control circuit 80, the status register 50 is reset with the result that the interruption control circuit 80 will not produce any interruption signal.

While the invention has been shown and described in terms of a preferred embodiment, it should be understood that the invention is not limited to the specific embodiment. For example, the number of types of the interruption conditions established by the command register 70 may be variable.

What we claim is:

1. An information processing system comprising first and second information processing units, a first-in first-out stack acting as a buffer and connected between said first and second information processing units, a first register connected to be set to a predetermined bit position in accordance with a programmed information from said first information processing unit for producing an interruption condition signal corresponding to said bit position, a first control circuit connected to detect the state of said first-in first-out stack for producing a state signal corresponding to the state of first-in first-out stack, a second register connected to be set to a predetermined bit position corresponding to said state signal from said first control circuit for generating a state indicating signal, and an interruption control circuit coupled to said first and second registers and to said first information processing unit for generating an interruption control signal when said state indicating signal from said second register satisfies an interruption condition established by the bit position of said first register.

2. The information processing system according to claim 1 which further comprises a second control circuit connected between said first-in first-out stack and said second information processing unit for detecting the state of said second information processing unit to produce a state signal corresponding to the state of said second information processing unit, and wherein said second register is coupled to said first and second control circuits so as to be set to a bit position corresponding to the state signals from said first and second control circuits for supplying a state indicating signal to said bit position to said interruption control circuit.

* * * * *